United States Patent
Bitman et al.

(10) Patent No.: US 10,324,282 B2
(45) Date of Patent: Jun. 18, 2019

(54) PIXEL ARRAY FOR AN ELECTROFLUIDIC DISPLAY ELEMENT AND CORRESPONDING DISPLAY ELEMENT

(71) Applicant: ADVANCED DISPLAY TECHNOLOGY AG, Appenzell (CH)

(72) Inventors: Andriy Bitman, Dortmund (DE); Dieter Jerosch, Bad Soden (DE); Oliver Müller-Marc, Appenzell (CH)

(73) Assignee: Advanced Display Technology AG (CH)

( * ) Notice: Subject to any disclaimer, the term of this patent is extended or adjusted under 35 U.S.C. 154(b) by 409 days.

(21) Appl. No.: 15/305,733

(22) PCT Filed: Apr. 20, 2015

(86) PCT No.: PCT/EP2015/058520
§ 371 (c)(1),
(2) Date: Oct. 21, 2016

(87) PCT Pub. No.: WO2015/162094
PCT Pub. Date: Oct. 29, 2015

(65) Prior Publication Data
US 2017/0052361 A1    Feb. 23, 2017

(30) Foreign Application Priority Data

Apr. 22, 2014 (DE) .................. 10 2014 105 633

(51) Int. Cl.
*G02B 26/00* (2006.01)
*G02F 1/03* (2006.01)
*G02F 1/29* (2006.01)

(52) U.S. Cl.
CPC ......... *G02B 26/004* (2013.01); *G02B 26/005* (2013.01)

(58) Field of Classification Search
CPC .......... G02B 5/23; G02B 26/00; G02B 26/08; G02B 1/06; G02F 1/133; G02F 1/29;
(Continued)

(56) References Cited

U.S. PATENT DOCUMENTS

| | | |
|---|---|---|
| 2009/0185255 A1 | 7/2009 | Cheng et al. |
| 2012/0154886 A1 | 6/2012 | Heikenfeld et al. |
| 2013/0128337 A1 | 5/2013 | Takahashi et al. |

FOREIGN PATENT DOCUMENTS

| | | |
|---|---|---|
| DE | 102012110663 A1 | 5/2014 |
| JP | 2004144998 A | 5/2004 |

OTHER PUBLICATIONS

International Search Report (in English and German) and Written Opinion (in German) for PCT/EP2015/058520, dated Dec. 17, 2015; ISA/EP.

*Primary Examiner* — Dawayne Pinkney
(74) *Attorney, Agent, or Firm* — Harness, Dickey & Pierce, PLC (57) ABSTRACT

The disclosure relates to a pixel array for an electrofluidic display element, comprising a plurality of adjacent pixels that form the pixel array, each pixel having a pixel chamber with a polygonal, preferably rectangular, pixel surface and a height. Each pixel has at least one main reservoir channel which opens, via a first width (D) and length (L), into the pixel chamber and a single- or multi-part reservoir channel which surrounds the chamber, borders the pixel surface and opens, along its length and a second width into the pixel chamber. A polar and/or electrically conductive liquid is or can be held in the pixels, said liquid being capable of motion back-and-forth between the reservoir channels and the pixel chamber by the application of an electric field, and the reservoir channels surrounding adjacent pixels run towards each other in a corner region in which the adjacent pixels border one another. The invention is characterized in that the
(Continued)

second width (A) is smaller than the first width (D), the at least one main reservoir channel of each of the adjacent pixels opens into the surrounding reservoir channel at the corner region via at least one mouth junction having a third width (C) which is smaller than the first width (D), and the height of the pixel chamber is greater than or equal to the second width (A). Also disclosed is a corresponding display element.

11 Claims, 6 Drawing Sheets

(58) Field of Classification Search
CPC ..... G02F 1/01; G02F 1/03; G02F 1/15; G02F 1/155; G02F 1/153
USPC ........ 359/290–293, 295, 315–316, 276, 238, 359/245, 242, 259, 244, 253–254, 359/265–275, 665–667, 223–225, 243, 359/260–263
See application file for complete search history.

PIXEL ARRAY FOR AN ELECTROFLUIDIC DISPLAY ELEMENT AND CORRESPONDING DISPLAY ELEMENT

CROSS-REFERENCE TO RELATED APPLICATIONS

This application is a 371 U.S. National Stage of International Application No. PCT/EP2015/058520, filed on Apr. 20, 2015, which claims priority to German Application 10 2014 105 633.7, filed on Apr. 22, 2014. The entire disclosures of the above applications are incorporated herein by reference.

FIELD

The disclosure relates to a pixel array for an electrofluidic display element. The pixel array is constructed from a plurality of adjacent pixels each of which has a pixel chamber with a polygonal, preferably rectangular, pixel surface and a height. Each pixel possesses moreover at least one main reservoir channel that opens via its first width and length into the pixel chamber and a single- or multi-piece surrounding reservoir channel. The surrounding reservoir channel borders the pixel channel and opens along its length and width into the pixel channel. A polar and/or electrically conductive fluid is received, or can be received, in the pixels that can be moved back and forth between the reservoir channels and the pixel chamber by applying an electrical field. The surrounding reservoir channels of adjacent pixels run towards each other in a corner region in which the adjacent pixels border each other. The pixels can be connected fluidically so that the reservoir channels of all the pixels of the pixel array form a common reservoir for the polar and/or electrically conductive fluid. The reservoir channels in the corner regions are connected fluidically for this purpose.

BACKGROUND

This section provides background information related to the present disclosure which is not necessarily prior art.

A typical pixel array is known from the subsequently published DE 10 2012 110 663 A1. In this instance, the reservoir channel has a specific width that is greater than or equal to the height of the pixel chamber. Furthermore, the length of the main reservoir channel can be greater than, or equal to, the width of the pixel chamber. With pixel chamber dimensions and the volume of the reservoir coordinated with each other in this manner, the polar and/or electrically conductive fluid always has approximately the same surface energy, regardless of whether it is in the volume of the reservoir or in the pixel chamber. Thus the energy that is required for the movement of the fluid from the volume of the reservoir into the pixel volume, and thus for the switching process, is reduced to a minimum.

However, the pixel array known from the aforementioned publication suffers from the disadvantage that, at the crossing points at which the surrounding reservoir channels connect, the pixel array demonstrates a critical behavior in that it has been shown that the color drops of the individual pixels exhibit a fluid connection to their neighboring pixels. The disadvantage is that the fluid volume assigned to a specific pixel no longer appears as a separate drop of fluid and behaves accordingly when a control voltage is applied, but instead a complex fluidic system is generated consisting of several drops of liquid joined together fluidically across the borders of the pixels. The disadvantage is that when a control voltage is applied to individual pixels, occasionally it is not possible to activate the pixels independently of each other.

SUMMARY

This section provides a general summary of the disclosure, and is not a comprehensive disclosure of its full scope or all of its features.

It is, therefore, the object of the disclosure to propose a typical pixel array and a corresponding display element that allow individual activation of a single pixel independently of the pixels adjoining the activated pixel.

The distinguishing feature of the pixel array is that the width of the surrounding reservoir channel is smaller than the width of the main reservoir channel, wherein the at least one main reservoir channel of each the adjacent pixels in the corner region opens via at least one junction into the surrounding main reservoir channel. The width of the junction is smaller than the width of the main reservoir channel, where the pixel chamber height is greater than, or equal to, the width of the surrounding reservoir channel. Through the use of junctions with the aforementioned dimensions, when activating a specific pixel in the pixel array, fluid from adjacent pixels is prevented from being activated as well and entering the particular pixel chamber from the reservoir channels of adjacent pixels. In particular, a contributory circumstance is that because of the disclosure's geometry, the polar and/or electrically conductive fluid is retained as separate or quasi-separate fluid drops in the main reservoir channel of its assigned pixel due to the junction, and the continuum from the adjacent main reservoir channels is broken up due to the potential barriers formed by the junctions. This ensures that when a particular pixel is activated, the fluid in the main reservoir channels of adjacent pixels remains there in its entirety.

In one embodiment of the disclosure, a connecting chamber is formed in the corner region into which the main reservoir channel (via the junction) and the surrounding reservoir channel open so that the main reservoir channel is connected fluidically via the connecting channel to the surrounding reservoir channel, wherein a restricting element, located in the connecting chamber, is surrounded by an annular gap, into which the main reservoir channel and the surrounding reservoir channel open, wherein the width of the annular gap is smaller than the width of the main reservoir channel, and smaller than, or equal to, the height of the pixel chamber. The width of the annular gap is thus in its turn precisely matched in such a way that when a particular pixel is activated, there can be no overflow of fluid between adjacent pixels by way of the corner regions or the connecting chamber located there. The geometry of the annular gap is not restricted to any particular geometries and in particular not to circular symmetry. For example, polygonal annular gaps are also conceivable.

Depending on the embodiment, the restricting element can have a longitudinally symmetrical geometry, for example a columnar shape, wherein the restricting element can extend along its longitudinal axis over the entire height of the pixel chamber or over a part of the height of the pixel chamber, The restricting element can have a circular, an elliptical, or a polygonal, for example rectangular or square, cross-section in the plane perpendicular to its longitudinal axis.

In another embodiment of the disclosure, provision is made for the chambers of the pixels to have a rectangular, for example a square, pixel surface, wherein the pixels are arranged in a regular pattern of lines and columns. The surrounding reservoir channels are configured as channels extending across the entire width, or length, of the pixel array. The channels extending in the transverse direction are arranged perpendicular to the channels extending in the lengthwise direction so that the channels cross in the corner regions and are connected to each other there fluidically.

It is frequently advantageous to obtain a particularly consistent filling of pixels having a rectangular pixel surface if each pixel has two main reservoir channels which cross and extend respectively between two corner regions situated diagonally across from one another.

A junction can extend from the respective oppositely located ends of the main reservoir channels which passes over a first kink into one of the main reservoir channels and which passes over a second kink into the surrounding reservoir channel. An additional potential barrier is provided by the kinks which contributes to dividing the fluid into individual, pixel-related drops and prevents the fluid from overflowing out of the reservoir channels via the corner regions when an adjacent pixel is activated.

With yet another embodiment, in which the pixel chambers similarly have a rectangular, for example square, pixel surface and in which the pixels are arranged in a regular pattern of lines and columns, and wherein each pixel has two main reservoir channels which cross each other and extend between two corner regions located diagonally opposite each other, provision is made for the surrounding reservoir channels to border a rectangular pixel surface being made up of four side sections perpendicular to each other, of which two pairs of oppositely located, parallel side sections are fluidically connected in each case to a main reservoir channel via a junction.

To provide a further potential barrier, provision can be also be made with this embodiment for each of the junctions to pass over a first kink into the main reservoir channel and over a second kink into the reservoir channel.

To further improve the selective activation of the individual drops of fluid in the pixels, provision is made in one embodiment of the disclosure for the width of the main reservoir channels to be greater than, or equal to, the height of the pixel chambers.

In one variation of the pixel array according to the disclosure, which similarly achieves the underlying object of the disclosure, provision is made for each pixel in the array to have a surrounding reservoir channel which borders the pixel surface and opens into the pixel chamber along its length and width, wherein a polar and/or electrically conductive fluid is, or can be, held in the pixels that can be moved back and forth by applying an electrical field between the reservoir channel and a particular pixel chamber, wherein the surrounding reservoir channel of adjacent pixels in corner regions in which four adjacent pixels adjoin each other are connected fluidically to one another and form a common reservoir channel grid. The width of the reservoir channel is greater than, or equal to, the height of the pixel chamber.

The pixel array in accordance with the disclosure is suitable for use in an electrofluidic display element that has an active matrix of control electrodes for the individual activation of the individual pixels in the array, wherein one of the control electrodes is assigned to each of the pixels. The control electrodes can be activated individually so that with their aid the pixel chamber of a specific pixel can be optionally charged with an electrical field. Alternatively, control of the pixel array can also be effected with the aid of a passive matrix or with other control electronics known from the prior art.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Additional details of the disclosure are explained using the following Figures.

DETAILED DESCRIPTION

Example embodiments will now be described more fully with reference to the accompanying drawings.

All of the embodiments shown in FIGS. 1 to 5 have in common that they have an arrangement of essentially square pixels 2 disposed in lines and columns so that every four pixels form a set of adjacent pixels that are connected fluidically to one another at least over one corner region 6. In addition, the pixels 2 in each case have surrounding reservoir channels 5 which share adjacent pixels 2. The surrounding reservoir channels 5 cannot be assigned, therefore, unambiguously to one particular pixel 2. In addition, each pixel 2 of the embodiments according to FIGS. 1 to 4 has a pair of main reservoir channels 4 that cross and are in each case assigned to a specific pixel 2, that extend diagonally across the pixel surface and hold the volume of fluid required to fill the assigned pixel chamber 3. The diagonal arrangement of the main reservoir channels 4 represents the preferred embodiment. However, the main reservoir channels can instead be at a different angle to each other and in particular not extend diagonally.

Figure 1:
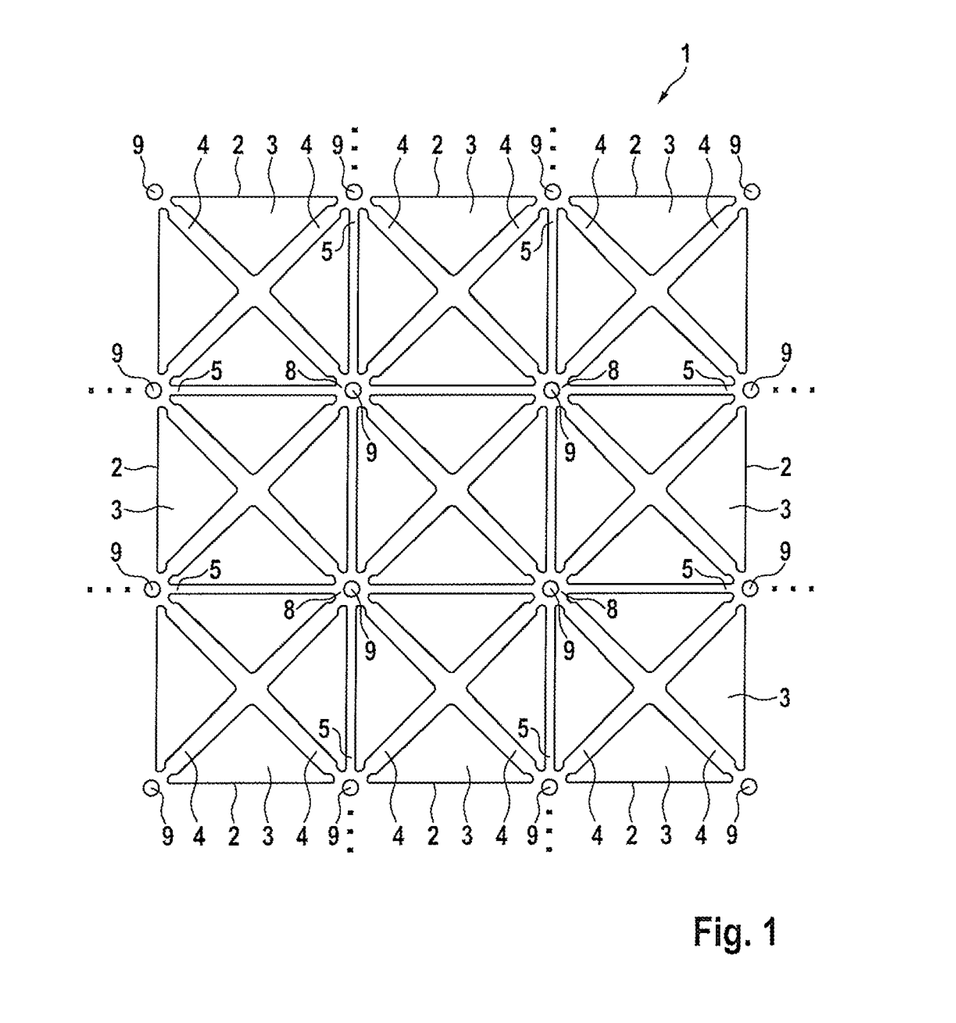
FIG. 1 shows a plan view of a first embodiment of the pixel array according to the disclosure.
Figure 2:
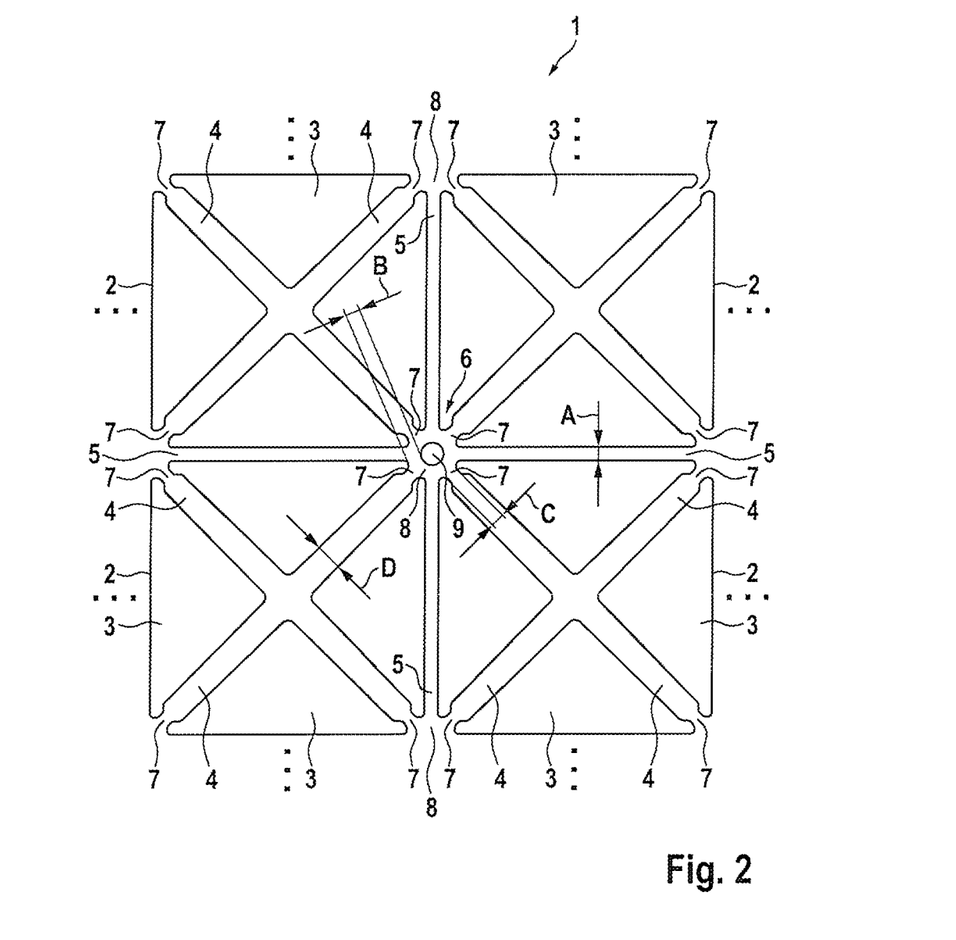
FIG. 2 shows a section of the pixel array from FIG. 1.

In the case of the embodiment shown in FIGS. 1 and 2, a connecting chamber 8, via which the main reservoir channels 4 and the surrounding reservoir channels 5 of the four adjacent pixels 2 are connected fluidically to each other, is formed in the corner region 6 in which a set of four pixels 2 with a square pixel surface border one another. A restricting element 9 is located in the connecting chamber 8. Said element is shaped as a column with a circular cross-section. The restricting element 9 can extend over the entire height of the pixel chamber 3 or only over one part of the pixel chamber height. In the event that the restricting element 9 extends only over one part of the pixel chamber height, it can extend from the cover substrate of the pixel or from the base substrate of the pixel so that there a clearance to the base substrate or to the cover substrate respectively on its face. Together with the connecting chamber 8, the restricting element 9 forms an annular gap between the connecting chamber 8 and the restricting element 9 into which pixel 2 one of the two main reservoir channels 4 that cross one another and are fluidically connected opens via a junction 7. Furthermore, four reservoir channels 5 that separate the pixels 2 bordering one another open into the annular gap.

The width A of the surrounding reservoir channels 5, the width B of the annular gap and the width C of the mouth openings 7 is in each case smaller than the width D of the main reservoir channels 4. Furthermore, the width A of the surrounding reservoir channels 5 and the width B of the annular gap is smaller than, or equal to, the height of the pixel chamber. This contributes to separating the fluid into drops that are independent of one another and assigned to specific pixels so that when a specific pixel 2 is activated, there is no fluidic fluid spillover via the connecting chamber 8 between the activated pixel 2 and the pixel 2 adjoining the activated pixel 2.

Figure 3:
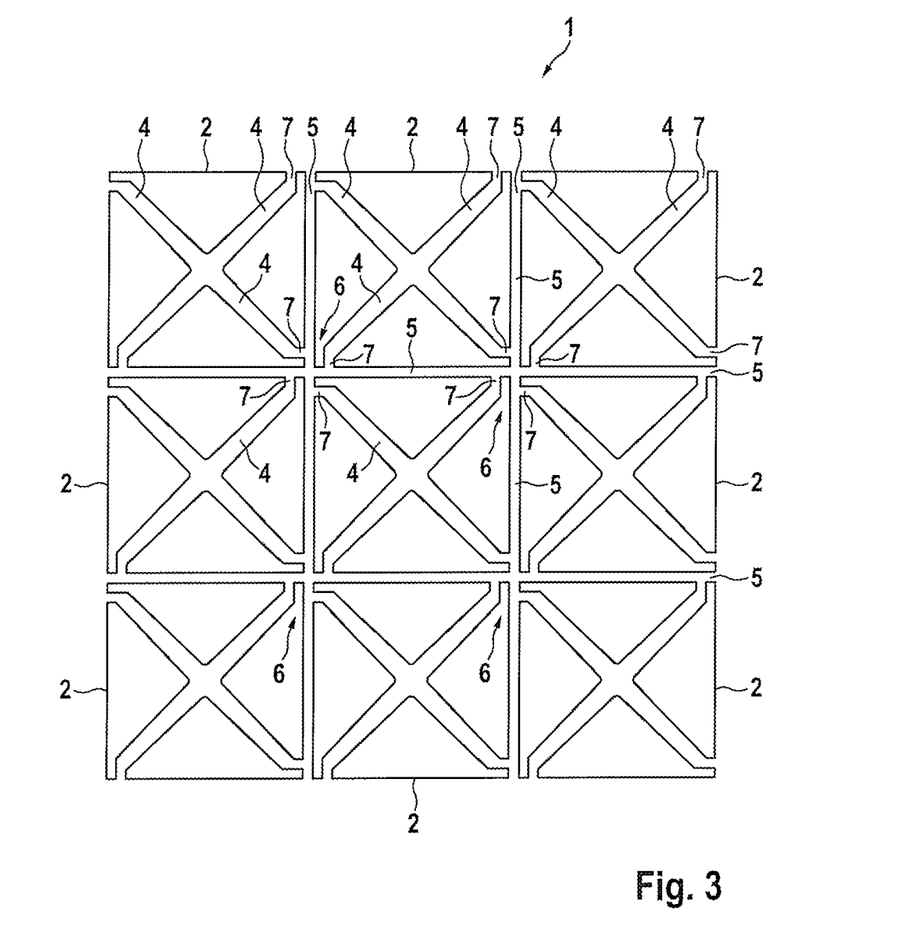
FIG. 3 shows a plan view of a second embodiment of the pixel array according to the disclosure.

The embodiment depicted in FIG. 3 differs from the embodiment shown in FIGS. 1 and 2 in that no connecting chamber is formed in the corner regions 6 in which four pixels 2 border one another; instead, the surrounding reservoir canals 5 of the four adjoining pixels 2 cross one another and thus are connected fluidically. The main reservoir channels 4 that cross one another and extend diagonally over the pixel surface of each pixel 2 open via one junction 7 in corner regions 6 into the surrounding reservoir channels 5. The main reservoir channels 4 pass over a first kink into the junction 7, wherein the junction 7 passes over a second kink, which here is at a 90° angle, into the surrounding reservoir channels 5. The kinks form a further potential barrier to separate the fluid into drops assigned to a specific pixel so that when an electric field is applied to a particular pixel 2, fluid is prevented from escaping from the pixels 2 adjoining the activated pixel 2.

Figure 4:
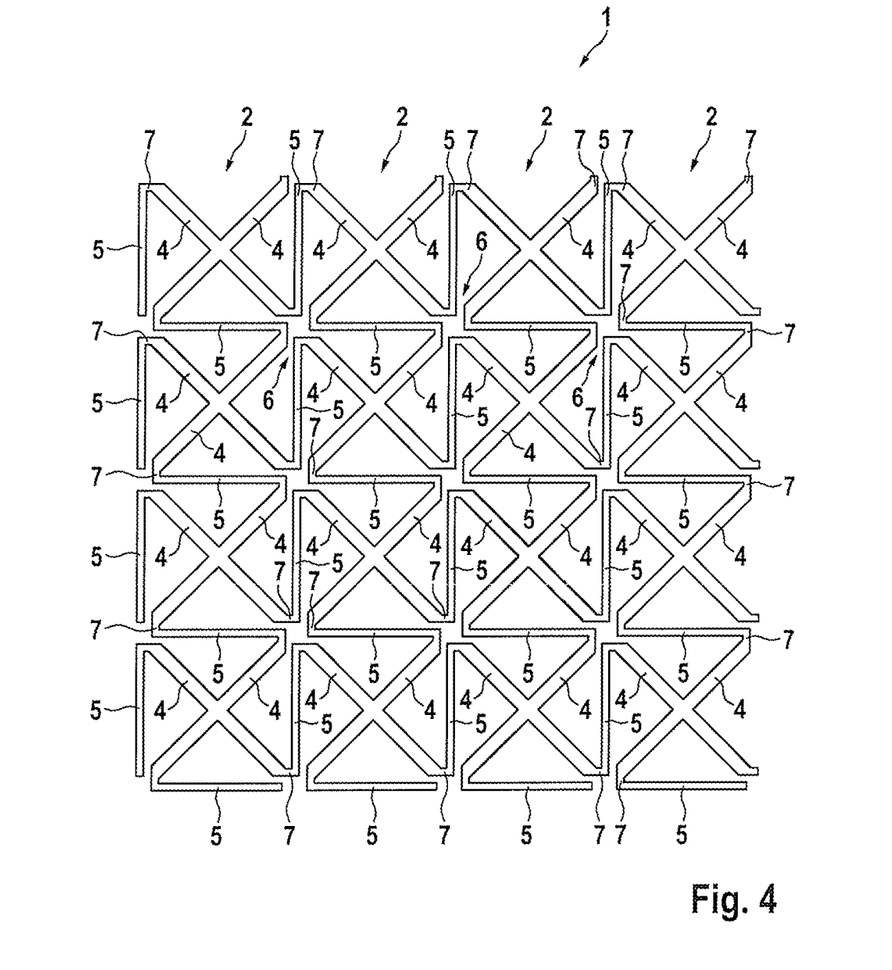
FIG. 4 shows a plan view of a third embodiment of the pixel array according to the disclosure.

In the case of the embodiment shown in FIG. 4, the surrounding reservoirs are composed of four side wall sections of which two pairs of oppositely located, parallel side wall sections are fluidically connected via a junction 7 of one and the same main reservoir channel 4. The junction 7 is in turn configured in such a manner that the main reservoir channel 4 is connected via two kinks to the surrounding reservoir channel 5. Unlike the previously described embodiments, no provision is made in the case of the embodiment depicted in FIG. 4 for the main reservoir channels 4 and the surrounding reservoir channels 5 of one set of four pixels 2 in a corner region 6 of the four adjoining pixels to be connected fluidically. Instead, only the previously described fluidic connections between the main reservoir channels 4 of each pixel 2 to the reservoir channels 5 surrounding and encircling this pixel 2 are provided.

In the case of the embodiment depicted in FIG. 5, the pixels are again arranged in a regular pattern of lines and columns, wherein the surrounding reservoir channels 5 extend over the entire width, or length, of the pixel array 1 and thus form a common reservoir channel grid. The width A of the surrounding reservoir channels 5 is selected exactly so that it is larger than, or the same as, the height of the pixel chamber 3. In this embodiment no separation is provided between main reservoir channels and surrounding reservoir channels. Instead, both types of channel are combined in one channel grid. The electrically conductive and/or polar fluid is provided in the channel grid and thus is within the compass of each pixel.

Figure 5:
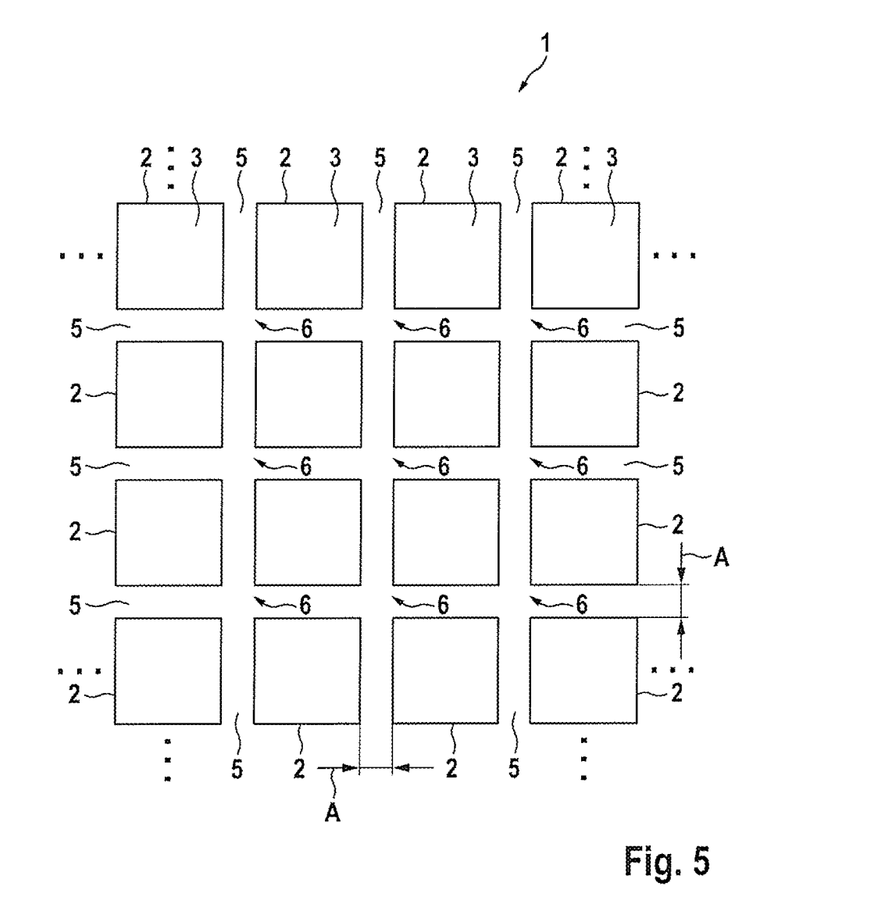
FIG. 5 shows a plan view of a fourth embodiment of the pixel array according to the disclosure.
Figure 6:
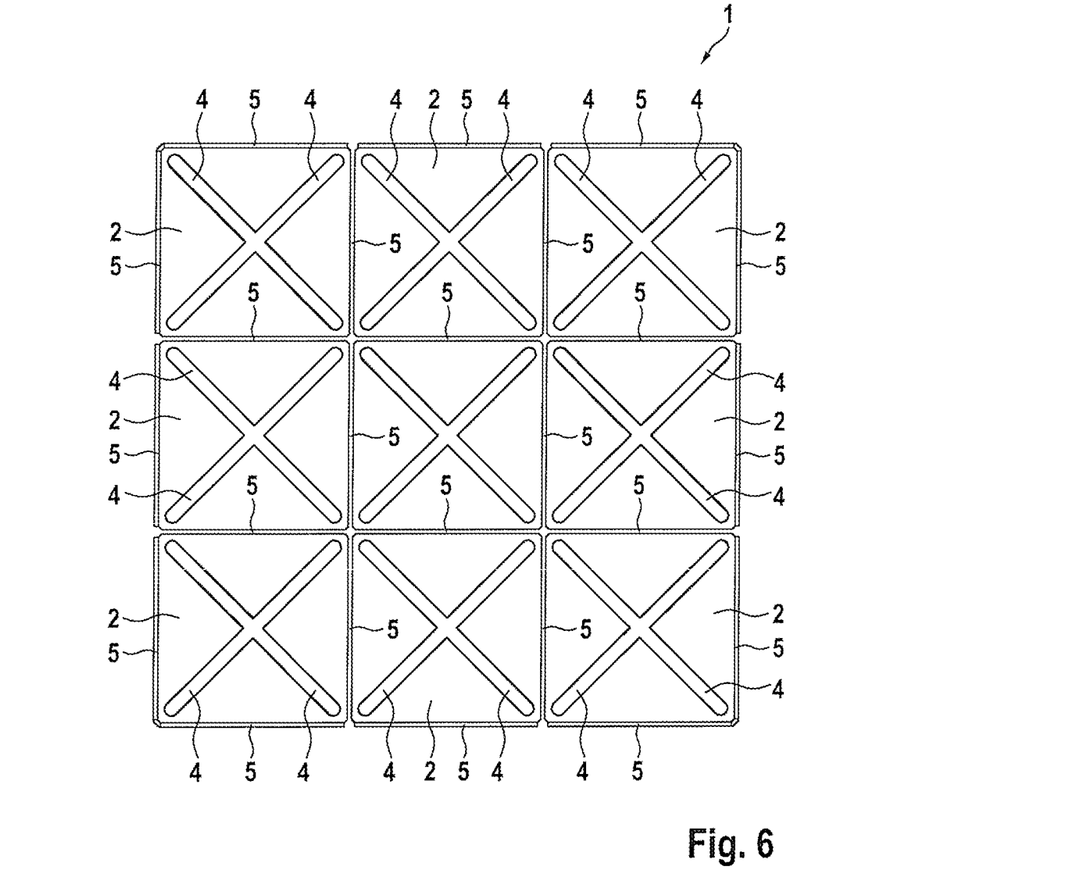
FIG. 6 shows a plan view of a fifth embodiment of the pixel array according to the disclosure.

In a further development of the embodiment shown in FIG. 5, the pixel array 1 shown in FIG. 6 has pixels 2 with two crossed main reservoir channels 4 that extend between oppositely lying crossing points of the surrounding reservoir channels 5, wherein, however, no fluidic connection and in particular no junction is formed between the main reservoir channels 4 and the surrounding reservoir channels 5.

The features of the disclosure disclosed in the preceding description, in the drawings and the claims can be essential, both individually and in any combination, to the realization of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed:

1. A pixel array for an electrofluidic display element comprising a plurality of adjacent pixels, pixels forming the pixel array each having a pixel chamber with a polygonal pixel surface and a height, wherein each pixel has at least one main reservoir channel that opens into the pixel chamber over its first width (D) and length (L), and a single- or multi-part surrounding reservoir channel that borders the pixel surface and opens into the pixel chamber along its length and its second width (A), wherein a polar and/or electrically conductive fluid is, or can be, held in the pixels, said liquid being movable back and forth between the channels by applying an electrical field, wherein the surrounding reservoir channels of adjacent pixels run towards one another in a corner region, wherein the second width (A) is smaller than the first width (D), wherein the at least one main reservoir channel of each of the adjacent pixels in the corner region opens into the surrounding reservoir channel via at least one junction which has a third width (C) that is smaller than the first width (D), and wherein the pixel chamber height is greater than, or equal to, the second width (A).

2. The pixel array according to claim 1, in which a connecting chamber is formed in the corner region into which the main reservoir channel, via the junction, and the surrounding reservoir channel open so that the main reservoir channel has a fluidic connection to the surrounding reservoir channel via the connecting chamber, wherein a restricting element is located in the connecting chamber which is surrounded by an annular gap into which the main reservoir channel and the surrounding reservoir channel open, wherein the annular gap has a fourth width (B) that is smaller than the first width (D) of the main reservoir channel and smaller than, or equal to, the height of the pixel chamber.

3. The pixel array according to claim 2, in which the restricting element has a lengthwise symmetrical geometry wherein the restricting element extends along its longitudinal axis over the entire height of the pixel chamber or over a part of the height of the pixel chamber.

4. The pixel array according to claim 3 in which the restricting element has a circular, an elliptical or a polygonal cross-section.

5. The pixel array according to claim 1, in which each of the pixel chambers of the pixels have a rectangular pixel surface, wherein the pixels are arranged in a regular pattern of lines and columns, wherein the surrounding reservoir channels are shaped as channels extending over the entire width, or length, of the pixel array, wherein the channels extending in the transverse direction are arranged perpendicular to the channels extending in the lengthwise direction, and wherein the channels in the corner regions cross one another and are connected fluidically to each other.

6. The pixel array according to claim 5, in which each pixel has two main reservoir channels that cross one another and extend between two diagonally oppositely located corner regions, wherein a junction extends from the oppositely situated ends of the main reservoir channels that passes over into one of the main reservoir channels via a first kink and that passes over into the surrounding reservoir channel via a second kink.

7. The pixel array according to claim 1, in which each of the pixel chambers of the pixels has a rectangular pixel surface, wherein the pixels are arranged in a regular pattern of lines and columns, wherein each pixel has two main reservoir channels that cross one another and in each instance extend between two corner regions located diagonally opposite each other, wherein the surrounding reservoir channels are composed of four side sections aligned perpendicular to each other, of which two pairs of oppositely located, parallel side section are connected fluidically to a main reservoir channel via a junction.

8. The pixel array according to claim 7, in which each of the junctions merges into the main reservoir channel via a first kink and into the surrounding reservoir channel via a second kink.

9. The pixel array according to claim 1, in which the first width (D) of the main reservoir channels is greater than, or equal to, the height of the pixel chamber.

10. A pixel array for an electro-fluidic display element, having a plurality of adjacent pixels that form the pixel array each pixel having a pixel chamber which has a polygonal pixel surface and a height, wherein the pixels are arranged in a regular pattern of lines and columns, each pixel having a surrounding reservoir channel that borders the pixel surface and opens into the pixel chamber along its length and its width, wherein a polar and/or electrically conductive fluid is, or can be, held in the pixels and can be moved back and forth between the reservoir channel (5) and the pixel chamber by applying an electrical field, where the surrounding reservoir channels of adjacent pixels are fluidically connected in corner regions where four adjacent pixels border one another and form a common reservoir channel grid and the width (A) of the reservoir channels is greater than, or equal to, the height of the pixel chamber.

11. The electro-fluidic display element having a pixel array according to claim 10 and a matrix of control electrodes for the individual activation of the single pixels of the pixel array, where one of the control electrodes is assigned to each of the pixels, individually controllable and via which the pixel chamber of a particular pixel can be optionally charged with an electrical field.

* * * * *